(12) United States Patent
Kinmartin et al.

(10) Patent No.: US 7,832,464 B2
(45) Date of Patent: Nov. 16, 2010

(54) FLEXIBLE HVAC MODULE WITH ADD-ON MULTI-ZONE SUB-ASSEMBLY

(75) Inventors: Jeffrey Charles Kinmartin, East Amherst, NY (US); Garrett Wade Hoehn, Kenmore, NY (US); Ardeean Scoccia, Amherst, NY (US); Debashis Ghosh, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 873 days.

(21) Appl. No.: 11/604,671

(22) Filed: Nov. 27, 2006

(65) Prior Publication Data

US 2007/0144728 A1 Jun. 28, 2007

Related U.S. Application Data

(60) Provisional application No. 60/748,242, filed on Dec. 7, 2005.

(51) Int. Cl.
*B60H 1/00* (2006.01)

(52) U.S. Cl. ................. 165/202; 165/42; 165/203; 62/244; 454/69

(58) Field of Classification Search ............ 165/41, 165/42, 43, 44, 202, 203, 204; 62/239, 244; 454/69
See application file for complete search history.

(56) References Cited

U.S. PATENT DOCUMENTS

| | | | |
|---|---|---|---|
| 5,062,352 A * | 11/1991 | Ostrand ............... 165/42 |
| 5,101,883 A | 4/1992 | Kinmartin et al. ........... 165/42 |
| 5,934,361 A * | 8/1999 | Parisi et al. ............ 165/43 |
| 6,223,772 B1 * | 5/2001 | Cummings et al. ......... 165/42 |
| 6,230,795 B1 | 5/2001 | Tsumooka et al. |
| 6,431,257 B1 * | 8/2002 | Sano et al. ............. 165/42 |
| 6,547,152 B1 * | 4/2003 | Pawlak, III ............ 165/41 |
| 6,772,833 B2 * | 8/2004 | Auer et al. ............. 165/203 |
| 6,827,141 B2 * | 12/2004 | Smith et al. ............ 165/202 |
| 6,904,763 B2 * | 6/2005 | Araki et al. ............ 62/244 |
| 7,074,122 B2 * | 7/2006 | Haupt et al. ............ 165/42 |
| 7,096,924 B2 * | 8/2006 | Araki et al. ............ 165/41 |
| 7,407,001 B2 * | 8/2008 | Newman et al. .......... 165/202 |
| 7,434,612 B2 * | 10/2008 | Alberternst et al. ...... 165/203 |
| 2002/0014331 A1 | 2/2002 | Bendell et al. |
| 2002/0117296 A1 * | 8/2002 | Smith et al. ............ 165/202 |
| 2003/0205370 A1 | 11/2003 | Kim |
| 2005/0159097 A1 * | 7/2005 | Newman et al. .......... 165/42 |
| 2005/0217295 A1 | 10/2005 | Alberternst et al. |
| 2006/0060343 A1 * | 3/2006 | Litwing et al. .......... 165/204 |
| 2007/0163772 A1 * | 7/2007 | Bhatti et al. ........... 165/202 |
| 2007/0240846 A1 * | 10/2007 | Pettitt ................. 165/42 |

* cited by examiner

*Primary Examiner*—Ljiljana (Lil) V Ciric
(74) *Attorney, Agent, or Firm*—Patrick M. Griffin

(57) ABSTRACT

An independent mixing valve sub-assembly which includes a casing defining a cold bias inlet, a hot bias inlet and a second zone inlet and a mechanism for mechanically attaching the casing to the housing of a HVAC module with the cold bias inlet, the hot bias inlet and the second zone inlet of the mixing valve sub-assembly in sealing engagement with a cold bias outlet, a hot bias outlet, and a second zone outlet of a HVAC module, respectively. The mixing valve sub-assembly may provide one or more streams of temperature-controlled air. Accordingly, different mixing valve sub-assemblies may be attached to one universal HVAC module to provide varying numbers of temperature zones.

19 Claims, 5 Drawing Sheets

FLEXIBLE HVAC MODULE WITH ADD-ON MULTI-ZONE SUB-ASSEMBLY

RELATED APPLICATIONS

This application claims the benefit of provisional application No. 60/748,242, filed Dec. 7, 2005.

BACKGROUND OF THE INVENTION

1. Field of the Invention

The present invention relates to an HVAC unit for providing temperature control to a vehicle cabin.

2. Description of the Prior Art

In an automotive vehicle, limited space is allotted beneath or in front of the instrument panel for the heating, ventilation, and air conditioning (HVAC) system. In vehicles having a single zone systems compactly designed to fit within the allotted space, it is sometimes desirable to provide an additional temperature-controlled zone. A system with multiple temperature-controlled zones allows the driver and passenger to have separate controls of the temperature in their respective zone thereby maximizing the comfort of each individual. Extending the zone system even further, i.e., a separate control for the rear seat region, may also be desirable.

Single zone systems are generally designed to optimally utilize the amount of available space in a given type of vehicle as well as to conform to the shape of that space. When a dual zone system is designed, it generally must conform to the same size and shape, thereby requiring additional function to be added without utilizing any extra space. Moreover, when a dual zone system is provided for a particular vehicle line, it is often desired to offer to customers the option of a less expensive single zone system as well. However, the designing and tooling of different systems is sometimes prohibitive for some vehicle models.

HVAC modules produced for use in vehicles typically provide temperature control either to a single zone or to dual zones, i.e., the entire HVAC module is dedicated to one or the other. HVAC modules that have the capability of providing temperature control for an additional zone are specifically designed, tooled and manufactured for the exact number of zones. The numbers or volumes for multiple zone modules are typically much lower than the numbers or volumes for single or dual zone modules. As such, it is much more expensive to design such a multiple zone module for so few vehicles. Additionally, it would be disruptive to the manufacturing cell and the manufacturing process in general to be forced to build an entirely different HVAC module to achieve an additional temperature-controlled zone.

The HVAC units of the prior art provide for multiple, separate streams of temperature-conditioned air being fed to multiple zones. U.S. Pat. No. 6,772,833 B2 to Auer, et al. provides for an HVAC unit including an evaporator, a heater core, a blower, a plurality of blending chambers and an insert mounted within the housing. The insert controls the flow of conditioned air from the blending chambers thus providing multiple separate streams of temperature-conditioned air to multiple zones.

Although the prior art provides for an HVAC unit capable of producing multiple temperature-controlled streams of air to be fed to multiple vehicle zones, a different HVAC unit must be designed and tooled for each discrete number of temperature-controlled streams, i.e., an entirely different HVAC unit for each number of independently temperature-controlled streams for different zones.

SUMMARY OF THE INVENTION AND ADVANTAGES

The invention provides for an independent mixing valve sub-assembly for attachment to an HVAC housing that defines a cold bias outlet, a hot bias outlet, a first zone outlet and a second zone outlet for providing a plurality of distinct streams of temperature-controlled air to a vehicle cabin. The mixing valve sub-assembly includes a casing defining a cold bias inlet, a hot bias inlet and a second zone inlet. A mechanism is included for mechanically attaching the casing with the cold bias inlet in sealing engagement with the cold bias outlet and with the hot bias inlet in sealing engagement with the hot bias outlet and with the second zone inlet in sealing engagement with the second zone outlet to deliver at least one stream of mixed air having a predetermined temperature independent of the temperature of the air exiting the first zone outlet of the HVAC housing whereby the mixing valve sub-assembly may be selected from a plurality of mixing valve sub-assemblies each having a different configuration for delivering different numbers of streams of mixed air.

The proposed invention provides a universal HVAC module that is designed, tooled and built as a single- or dual-zone module with a mixing valve sub-assembly attached to the module to provide additional, distinct temperature controlled streams. Accordingly, different mixing valve sub-assemblies may be attached to one universal HVAC module to provide varying numbers of temperature zones.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
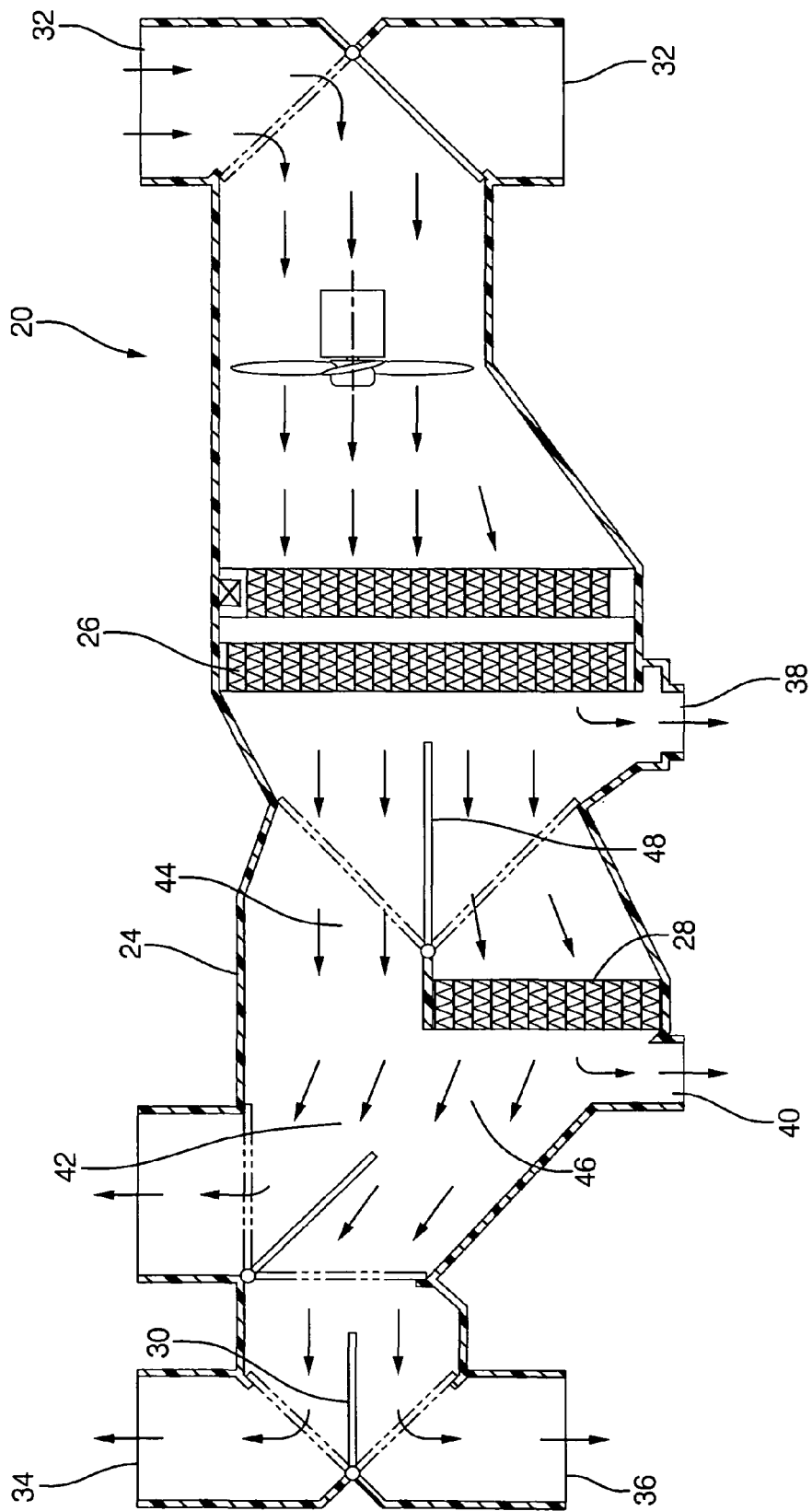
FIG. 1 is a schematic drawing of a typical HVAC module showing airflow.
Figure 2:
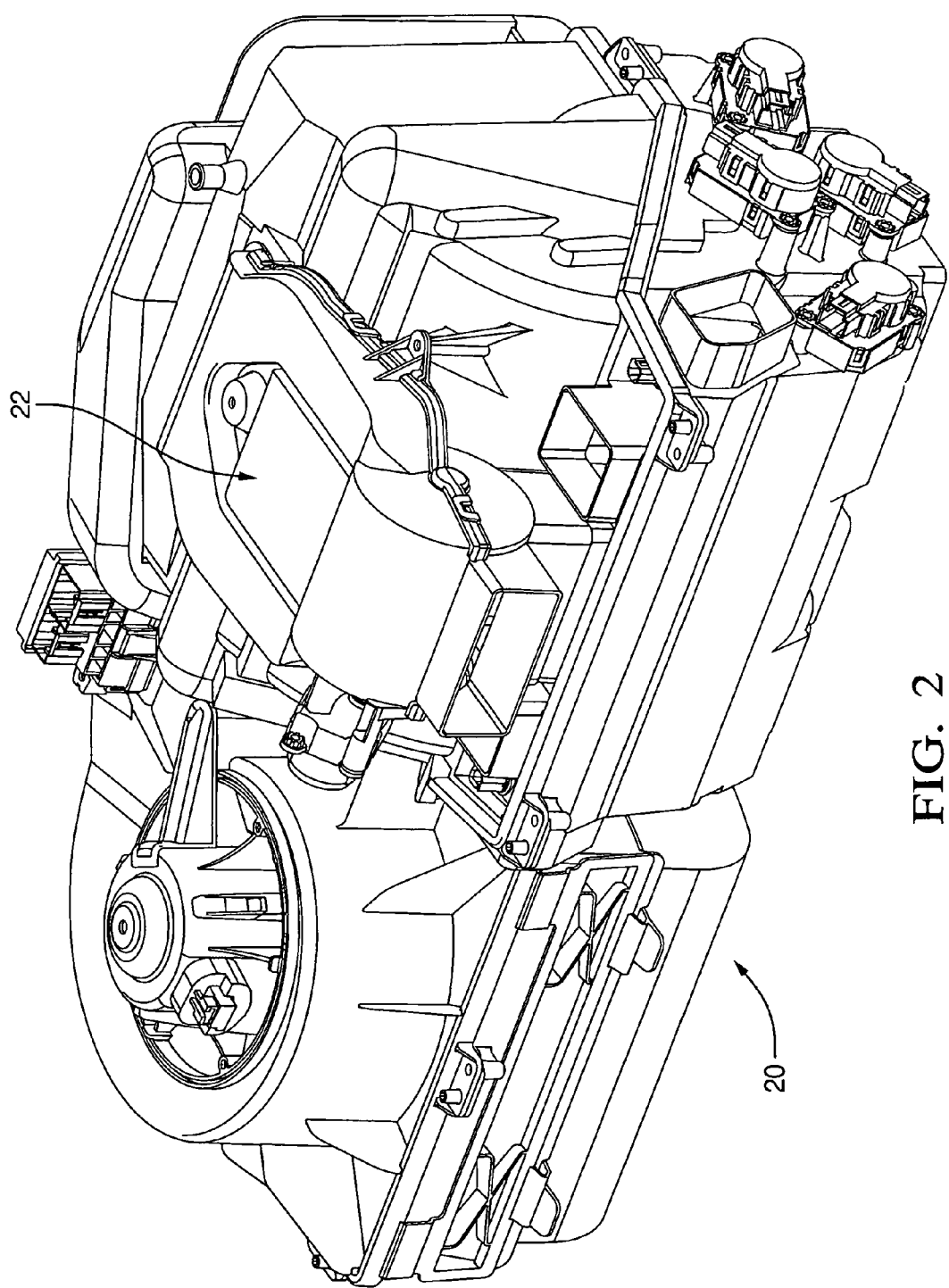
FIG. 2 is a perspective view of an HVAC module with an attached mixing valve sub-assembly (shown upside down)
Figure 3:
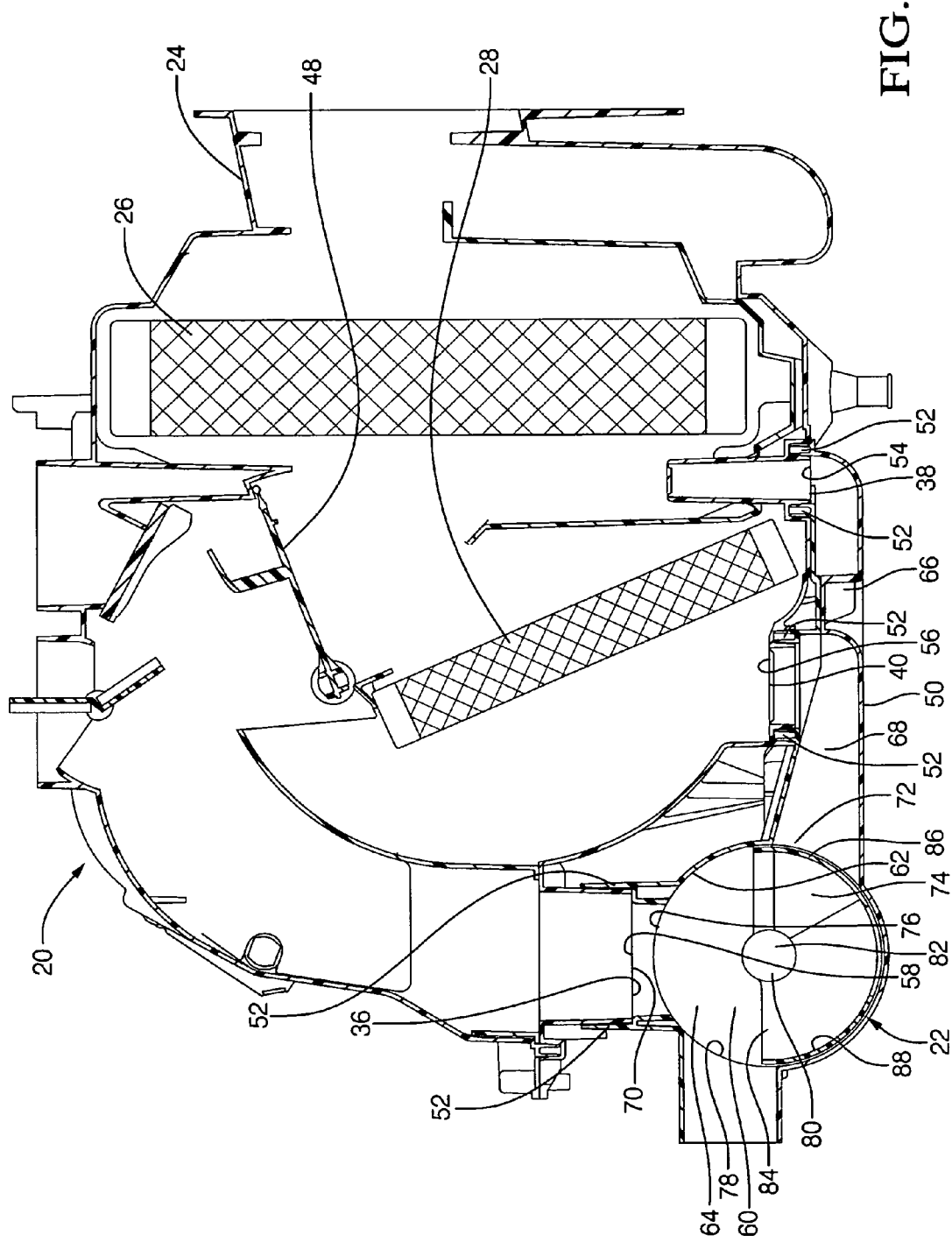
FIG. 3 is a cross-sectional view of an HVAC module with an attached mixing valve sub-assembly.

Referring to the Figures, wherein like numerals indicate corresponding parts throughout the several views, an HVAC unit 20 with a mixing valve sub-assembly 22 is shown in FIG. 2. The HVAC unit 20 comprises a housing 24, an evaporator 26, a heater core 28, a zone valve 30 and a mixing valve sub-assembly 22.

The housing 24 defines a primary inlet 32, a first zone outlet 34, a second zone outlet 36 for conveying air between the primary inlet 32 and the first and second zone outlets 34, 36. The evaporator 26 is supported by the housing 24 and is disposed downstream of the primary inlet 32. The evaporator 26 cools the air entering from a primary inlet 32, one of the primary inlets 32 conveying outside air and the other conveying inside air. A cold bias outlet 38 is defined by the housing 24 downstream of the evaporator 26 for bleeding cool air from the evaporator 26. The heater core 28 is supported by the housing 24 and is disposed downstream of the evaporator 26. The heater core 28 heats the cool air being delivered from the evaporator 26. A hot bias outlet 40 is defined by the housing 24 downstream of the heater core 28 for bleeding hot air from the heater core 28. The housing 24 defines a mixing chamber 42 and a cool air path 44. The cool air path 44 conveys the cool air from the evaporator 26 to the mixing chamber 42. Additionally, the housing 24 defines a heated air path 46 parallel to the cool air path 44. The heated air path 46 conveys air from the heater core 28 to the mixing chamber 42. The mixing chamber 42 receives and mixes cool air from the evaporator 26 and hot air from the heater core 28. A temperature valve 48 is disposed between the heated air path 46 and the cool air path 44 for apportioning the flow of cool air originating in the evaporator 26 between the cool air path 44 (for airflow into the mixing chamber 42 and the heated air path 46 (for airflow through the heater core 28 then into the mixing chamber 42. The zone valve 30 is disposed downstream of the heater core 28 and between the first zone outlet 34 and the second zone outlet 36. The zone valve 30 apportions airflow from the mixing chamber 42 between the first zone outlet 34 and the second zone outlet 36. The first zone outlet 34 directs its stream of air to a first vehicle zone, while the second zone outlet 36 directs its stream of air to the mixing valve sub-assembly 22.

The mixing valve sub-assembly 22 is independent of and mechanically attached to the HVAC housing 24. The mixing valve sub-assembly 22 receives and mixes air from the cold bias outlet 38, the hot bias outlet 40, and the second zone outlet 36 and produces at least one additional stream of mixed air having a predetermined temperature independent of the air exiting the first zone outlet 34. The mixing valve sub-assembly 22 then delivers the mixed air to the appropriate vehicle zone or zones. Each vehicle zone represents a separate area of the vehicle that will receive a distinct temperature-controlled stream of air. For example, the first zone outlet 34 may deliver its stream of air to the front driver's area of the cabin, while the stream of air from the mixing valve sub-assembly 22 would be delivered to the front passenger's area of the cabin. In this regard, each zone receives a separate and distinct stream of air controlled by the person occupying the respective zone.

Figure 4:
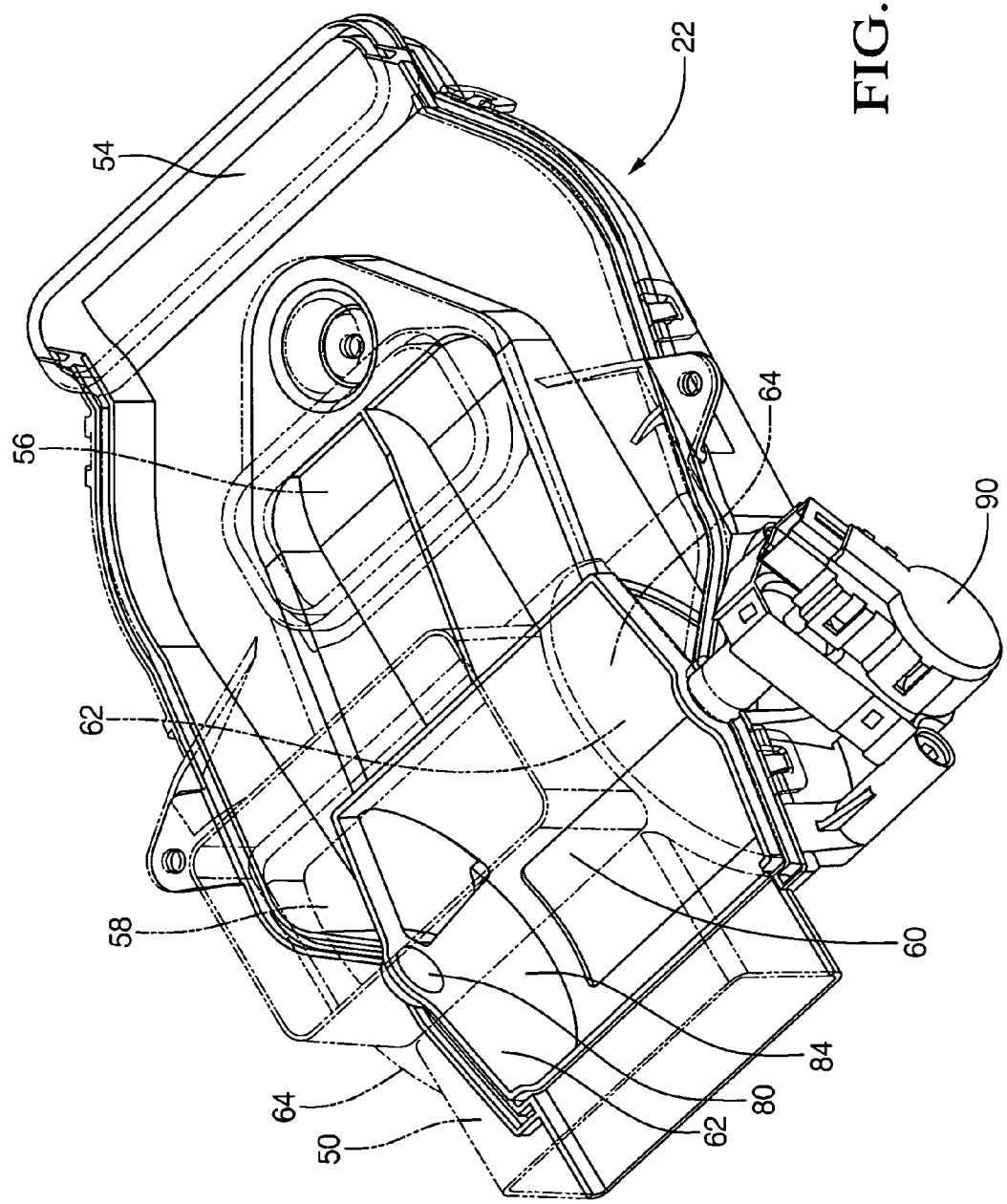
FIG. 4 is a perspective view of a first embodiment of the invention showing a single proportioning chamber for providing an additional temperature-controlled stream of air to an additional zone.
Figure 5:
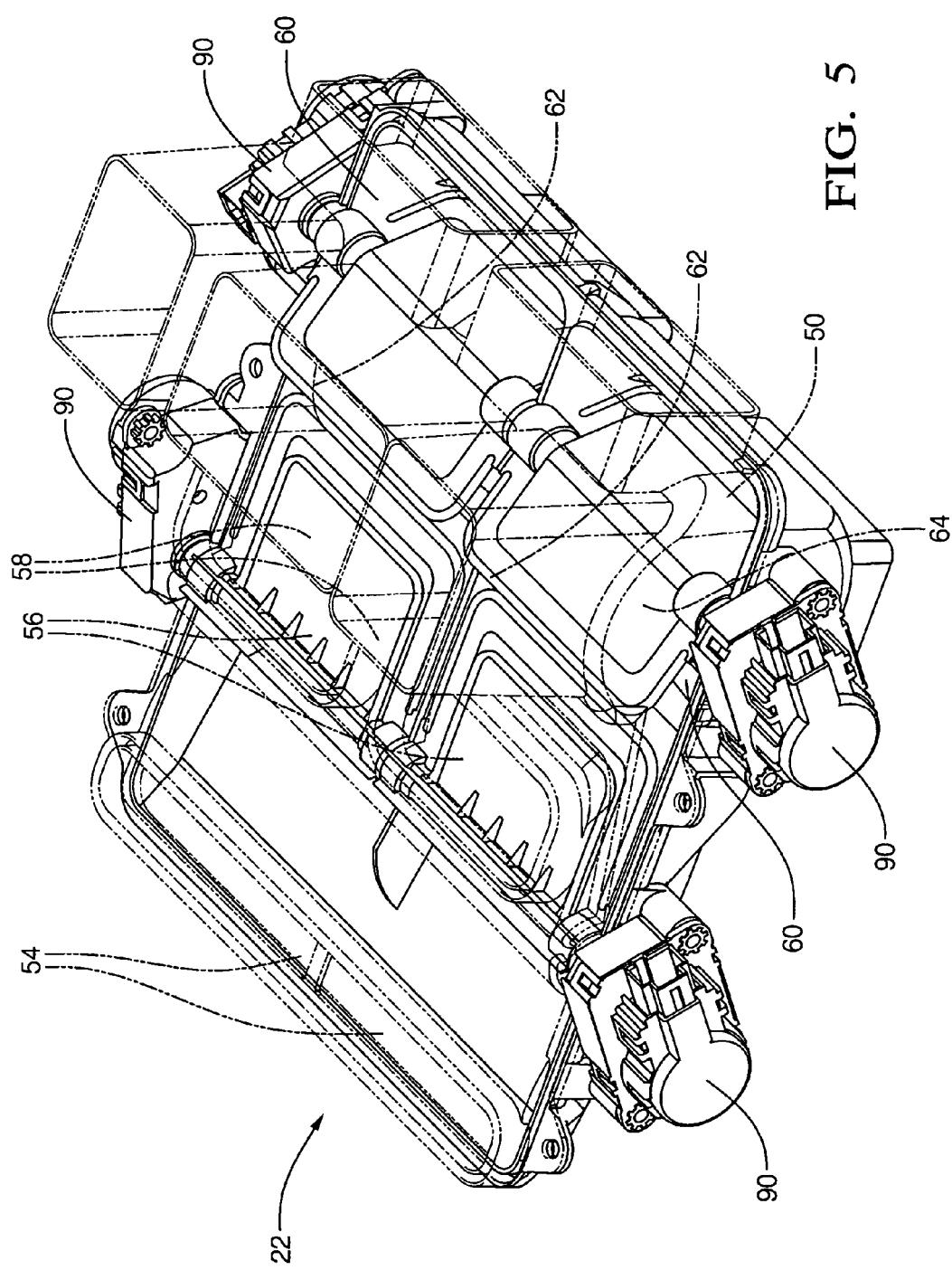
FIG. 5 is a perspective view of a second embodiment of the invention showing two proportioning chambers for providing two additional streams of temperature-controlled air to two additional zones.

The mixing valve sub-assembly 22 may be selected from a plurality of mixing valve sub-assemblies 22 each having a different configuration for delivering different numbers of streams of mixed air. The embodiment shown in FIG. 4 is a mixing valve sub-assembly 22 that yields a single mixed stream. The embodiment shown in FIG. 5 is a mixing valve sub-assembly 22 that yields two separate mixed streams each having independent temperatures. Similarly, additional mixing valve sub-assemblies 22 could be utilized that would produce more than two mixed streams all having independent temperatures. In each case, the stream or streams exiting the mixing valve sub-assembly 22 will be independent of the stream exiting the first zone outlet 34.

The mixing valve sub-assembly 22 comprises a casing 50 and a mechanism 52 for mechanical attachment to the housing 24 of the HVAC. The casing 50 defines a cold bias inlet 54, a hot bias inlet 56, a second zone inlet 58 and a proportioning chamber 60 having a cylindrical wall 62 and two circular end walls 64. The mechanism 52 is used to mechanically attach the casing 50 to the housing 24 of the HVAC with the cold bias inlet 54 in sealing engagement with the cold bias outlet 38, the hot bias inlet 56 in sealing engagement with the hot bias outlet 40 and the second zone inlet 58 in sealing engagement with the second zone outlet 36. Stated differently, the cold bias outlet 38, hot bias outlet 40 and second zone outlet 36 of the HVAC housing 24 are connected to the cold bias inlet 54, hot bias inlet 56 and second zone inlet 58 of the sub-assembly casing 50. The mechanism 52 for mechanical attachment may comprise various snap-together elements or fasteners. For example, the mixing valve sub-assembly 22 may include ramps that snap into slots in the HVAC housing 24 and vice versa.

The casing 50 also defines a cold bias conduit 66 for conveying air from the cold bias inlet 54 to the proportioning chamber 60, a hot bias conduit 68 for conveying air from the hot bias inlet 56 to the proportioning chamber 60 and a second zone conduit 70 for conveying air from the second zone inlet 58 to the proportioning chamber 60. The hot bias conduit 68 leads from the hot bias inlet 56 and terminates in a hot bias aperture 72 in the cylindrical wall 62 of the proportioning chamber 60. The cold bias conduit 66 is forked to extend around the hot bias conduit 68. The cold bias conduit 66 terminates in two cold bias apertures 74 each in one of the circular end walls 64 of the proportioning chamber 60. The second zone conduit 70 leads from the second zone outlet 36 and terminates in a second zone aperture 76 in the cylindrical wall 62 of the proportioning chamber 60. The cold bias aperture 74, hot bias aperture 72 and second zone aperture 76 allow the air being conveyed by their respective conduits 66, 68, 70 to enter the proportioning chamber 60.

The casing 50 also defines a third zone aperture 78 in the cylindrical wall 62 for directing mixed air out of the casing 50. The hot bias aperture 72 is substantially diametrically opposite to the third zone aperture 78. In other words, the hot bias aperture 72 and third zone aperture 78 are, for the most part, diametrically across the cylindrical proportioning chamber 60 from each other. The second zone aperture 76 is disposed substantially at a right angle to the diametrically opposite hot bias aperture 72 and third zone aperture 78. In other words, the second zone aperture 76 is disposed in the top of the proportioning chamber 60 while the hot bias aperture 72 and the third zone aperture 78 are disposed on the sides of the proportioning chamber 60.

The proportioning chamber 60 is disposed downstream of the cold bias inlet 54, the hot bias inlet 56, and the second zone inlet 58. The proportioning chamber 60 receives and mixes air from the cold bias inlet 54, the hot bias inlet 56, and the second zone inlet 58 and produces at a stream of mixed air having a predetermined temperature independent of the air exiting the first zone outlet 34 of the HVAC housing 24.

The proportioning chamber 60 includes a mixing valve 80 disposed therein to facilitate mixing. The mixing valve 80 comprises a hub 82, a sector plate 84, a first curved plate 86 and a second curved plate 88.

The hub 82 is rotatably and centrally supported on each of the circular end walls 64 of the proportioning chamber 60. In other words, the hub 82 extends along the line between the centers of the circular end walls 64 and rotates around that same line. The sector plate 84 is adjacent each circular end wall 64 and extends between radial edges from the hub 82 to a circular outer periphery extending between the radial edges. Essentially, the sector plate 84 is pie-shaped. The sector plate 84 rotates between a closed position, which covers the respective cold bias apertures 74, and an open position, which fully opens the respective cold bias apertures 74. The first curved plate 86 is concentric with the cylindrical wall 62 and extends circumferentially from one of the radial edges of the sector plates 84 for controlling flow through the hot bias aperture 72. The second curved plate 88 is also concentric with the cylindrical wall 62. The second curved plate 88 extends circumferentially along the outer peripheries of the sector plates 84 for controlling flow out of the third zone aperture 78.

The mixing valve sub-assembly 22 also includes an actuator 90 connected to the hub 82. The actuator 90 rotates the hub 82, the sector plate 84, the first curved plate 86 and the second curved plate 88 for controlling flow of the air streams into and out of the proportioning chamber 60.

The casing 50 of the mixing valve sub-assembly 22 can also define a second proportioning chamber 60 in addition to the first with a second mixing valve 80 therein as shown in the embodiment of FIG. 5. In this case, the second proportioning chamber 60 would produce a second stream of mixed air having a second predetermined temperature independent of the air exiting the first proportioning chamber 60 and independent of the air exiting the first zone outlet 34 of the HVAC housing 24.

Similarly, the casing 50 of the mixing valve sub-assembly 22 can define more than two proportioning chambers 60 each producing its own stream of air having a separate predetermined temperature. In each of these cases, the additional proportioning chambers 60 would be fed by a cold bias inlet 54, hot bias inlet 56 and second zone inlet 58 and the respective conduits 66, 68, 70 in a manner similar to the embodiment utilizing a single proportioning chamber 60.

The invention also includes a method of fabricating an HVAC unit 20 having a housing 24 that defines an air path from a primary inlet 32 to a first zone outlet 34 and a second zone outlet 36, and supporting an evaporator 26 for cooling air, a heater core 28 for heating air and at least one temperature valve 48 for controlling the flow of air through the heater core 28.

The first step is the selection the mixing valve sub-assembly 22 from a plurality of mixing valve sub-assembly 22 configurations. Each configuration is to be used for receiving and mixing air from the cold bias outlet 38 and from the hot bias outlet 40 and from the second zone outlet 36, all of the HVAC housing 24, to deliver at least one stream of mixed air having a predetermined temperature independent of the temperature of the air exiting the first zone outlet 34 of the HVAC housing 24. The selection step is further defined as selecting a mixing valve sub-assembly 22 having a single proportioning chamber 60 for delivering a stream of mixed air having a predetermined temperature independent of the temperature of the air exiting the first zone outlet 34 of the HVAC housing 24. In the alternative, the selection step is further defined as selecting a mixing valve sub-assembly 22 having a plurality of proportioning chambers 60 for delivering a plurality of streams of mixed air each having a predetermined temperature independent of the temperature of the air exiting the first zone outlet 34 of the HVAC housing 24 and each having a predetermined temperature independent of each other. In this method, a universal HVAC module may be supplemented with any one of various mixing valve sub-assemblies 22, each providing a different number of temperature-controlled streams of mixed air having independent temperatures.

The second step is the attachment of the mixing valve sub-assembly 22 to the housing 24 of the HVAC so that the cold bias inlet 54 of the sub-assembly is in sealing engagement with the cold bias outlet 38 of the HVAC housing 24, the hot bias inlet 56 of the sub-assembly is in sealing engagement with the hot bias outlet 40 of the HVAC housing 24, and the second zone inlet 58 of the mixing valve sub-assembly 22 is in sealing engagement with the second zone outlet 36 of the HVAC housing 24. In other words, the cold bias outlet 38, hot bias outlet 40 and second zone outlet 36 of the HVAC housing 24 are connected to the cold bias inlet 54, hot bias inlet 56 and second zone inlet 58 of the sub-assembly casing 50.

Obviously, many modifications and variations of the present invention are possible in light of the above teachings. The invention may be practiced otherwise than as specifically described within the scope of the appended claims.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An HVAC unit comprising;
a housing defining a primary inlet, a mixing chamber, a first zone outlet, and a second zone outlet, wherein said housing conveys airflow from said primary inlet to said first and second zone outlets, an evaporator supported by said housing downstream of said primary inlet for cooling air being from said primary inlet, a heater core supported by said housing in said heater air path downstream of said evaporator for heating cool air delivered from said evaporator, a zone valve for apportioning airflow from said mixing chamber between said first zone outlet and said second zone outlet, said housing defining a cold bias outlet downstream of said evaporator for bleeding cool air from said evaporator,
said housing defining a hot bias outlet downstream of said heater core for bleeding hot air from said heater core, and
a mixing valve sub-assembly comprising
a casing defining:
(i) a cold bias inlet and a hot bias inlet and a second zone inlet, and means for attaching said casing with said cold bias inlet in sealing engagement with said cold bias outlet and with said hot bias inlet in sealing engagement with said hot bias outlet and with said second zone inlet in sealing engagement with said second zone outlet,
(ii) a proportioning chamber having a cylindrical wall and circular end walls downstream of said cold bias inlet and said hot bias inlet and said second zone inlet for receiving and mixing air from said cold bias inlet and said hot bias inlet and said second zone inlet and producing a stream of mixed air having a predetermined temperature independent of the temperature of the air exiting said first zone outlet,
(iii) a third zone aperture in said cylindrical wall for directing mixed air out of said casing, and
(iv) a cold bias conduit for conveying air from said cold bias inlet to said proportioning chamber and a hot bias conduit for conveying air from said hot bias inlet to said proportioning chamber and a second zone conduit for conveying air from said second zone inlet to said proportioning chamber, wherein said hot bias conduit terminates in a hot bias aperture in said cylindrical wall, said cold bias conduit is forked to extend around said hot bias conduit and terminates in a cold bias aperture in each of said circular end walls, and said second zone conduit terminates in a second zone aperture in said cylindrical wall, and wherein said hot bias aperture is substantially diametrically opposite to said third zone aperture and said second zone aperture is disposed substantially at a right angle to said diametrically opposite hot bias and third zone aperture; and a mixing valve disposed in said proportioning chamber for producing said stream of mixed air.

2. An assembly as set forth in claim 1 wherein said mixing valve includes a hub rotatably supported by and centrally of each of said circular end walls.

3. An assembly as set forth in claim 2 wherein said mixing valve includes a sector plate adjacent each circular end wall and extends between radial edges from said hub to a circular outer periphery extending between said radial edges for rotation between a closed position covering said respective cold bias apertures and an open position opening said respective cold bias apertures.

4. An assembly as set forth in claim 3 wherein said mixing valve includes a first curved plate concentric with said cylindrical wall and extending circumferentially from one of said radial edges of said sector plates for controlling flow through said hot bias aperture.

5. An assembly as set forth in claim 4 wherein said mixing valve includes a second curved plate concentric with said cylindrical wall and extending circumferentially along said outer peripheries of said sector plates for controlling flow out of said third zone aperture.

6. An assembly as set forth in claim 5 including an actuator connected to said hub for rotating said hub and said sector plate and said first curved plate and said second curved plate for controlling flow into and out of said proportioning chamber.

7. An independent mixing valve sub-assembly for attachment to an HVAC housing that defines a cold bias outlet and a hot bias outlet and a first zone outlet and a second zone outlet, said sub-assembly comprising;
  a casing defining:
  (i) a cold bias inlet and a hot bias inlet and a second zone inlet,
  (ii) a proportioning chamber downstream of said cold bias inlet and said hot bias inlet and said second zone inlet for receiving and mixing air from said cold bias inlet and said hot bias inlet and said second zone inlet and producing a stream of mixed air having a predetermined temperature independent of the temperature of the air exiting the first zone outlet,
  (iii) a cold bias conduit for conveying air from said cold bias inlet to said proportioning chamber and a hot bias conduit for conveying air from said hot bias inlet to said proportioning chamber and a second zone conduit for conveying air from said second zone inlet to said proportioning chamber; and
  (iii) a mechanism for mechanically attaching said casing with said cold bias inlet in sealing engagement with the cold bias outlet and with said hot bias inlet in sealing engagement with the hot bias outlet and with said second zone inlet in sealing engagement with the second zone outlet; and
  a mixing valve disposed in said proportioning chamber for producing said stream of mixed air having a predetermined temperature independent of the temperature of the air exiting the first zone outlet;
  wherein said proportioning chamber is defined by a cylindrical wall and circular end walls and said hot bias conduit terminates in a hot bias aperture in said cylindrical wall, and wherein said cold bias conduit is forked to extend around said hot bias conduit and terminates in a cold bias aperture in each of said circular end walls.

8. An assembly as set forth in claim 7 wherein said second zone conduit terminates in a second zone aperture in said cylindrical wall.

9. An assembly as set forth in claim 8 wherein said casing defines a third zone aperture in said cylindrical wall for directing mixed air out of said casing.

10. An assembly as set forth in claim 9 wherein said hot bias aperture is substantially diametrically opposite to said third zone aperture and said second zone aperture is disposed substantially at a right angle to said diametrically opposite hot bias aperture and third zone aperture.

11. An assembly as set forth in claim 10 wherein said mixing valve includes a hub rotatably supported by and centrally of each of said circular end walls.

12. An assembly as set forth in claim 11 wherein said mixing valve includes a sector plate adjacent each circular end wall and extends between radial edges from said hub to a circular outer periphery extending between said radial edges for rotation between a closed position covering said respective cold bias apertures and an open position opening said respective cold bias apertures.

13. An assembly as set forth in claim 12 wherein said mixing valve includes a first curved plate concentric with said cylindrical wall and extending circumferentially from one of said radial edges of said sector plates for controlling flow through said hot bias aperture.

14. An assembly as set forth in claim 13 wherein said mixing valve includes a second curved plate concentric with said cylindrical wall and extending circumferentially along said outer peripheries of said sector plates for controlling flow out of said third zone aperture.

15. An assembly as set forth in claim 14 including an actuator connected to said hub for rotating said hub and said sector plate and said first curved plate and said second curved plate for controlling flow into and out of said proportioning chamber.

16. A mixing valve sub-assembly adapted to engage an HVAC housing that has a cold bias outlet, a hot bias outlet, a first zone outlet, and a second zone outlet, wherein said mixing valve sub-assembly comprises:
  a casing defining:
    a cold bias inlet, a hot bias inlet, and a second zone inlet adapted to sealingly engaged to said cold bias outlet, hot bias outlet, and said second zone outlet of said HVAC housing, respectively;
    a proportioning chamber having a cylindrical wall and circular end walls;
    a cold bias conduit for conveying air from said cold bias inlet to said proportioning chamber;
    a hot bias conduit for conveying air from said hot bias inlet to said proportioning chamber; and
    a second zone conduit for conveying air from said second zone inlet to said proportioning chamber;
    wherein said hot bias conduit terminates in a hot bias aperture in said cylindrical wall, said cold bias conduit is forked to extend around said hot bias conduit and terminates in a cold bias aperture in each of said circular end walls, said second zone conduit terminates in a second zone aperture in said cylindrical wall said,
    wherein said casing further defines a third zone aperture in said cylindrical wall for directing mixed air out of said casing, said hot bias aperture is substantially diametrically opposite to said third zone aperture and said second zone aperture is disposed substantially at a right angle to said diametrically opposite hot bias aperture and third zone aperture; and a mixing valve disposed in said proportioning chamber for producing said stream of mixed air having a predetermined temperature independent of the temperature of the air exiting the first zone outlet.

17. An mixing valve sub-assembly of claim 16 wherein said mixing valve comprises:

a hub rotatably supported by and centrally of each of said circular end walls;

a sector plate adjacent each circular end wall and extends between radial edges from said hub to a circular outer periphery extending between said radial edges for rotation between a closed position covering said respective cold bias apertures and an open position opening said respective cold bias apertures; and a first curved plate concentric with said cylindrical wall and extending circumferentially from one of said radial edges of said sector plates for controlling flow through said hot bias aperture.

18. An independent mixing valve sub-assembly of claim 17 wherein said mixing valve includes a second curved plate concentric with said cylindrical wall and extending circumferentially along said outer peripheries of said sector plates for controlling flow out of said third zone aperture.

19. An independent mixing valve sub-assembly of claim 18 including an actuator connected to said hub for rotating said hub and said sector plate and said first curved plate and said second curved plate for controlling flow into and out of said proportioning chamber.

* * * * *